Patented Apr. 12, 1927.

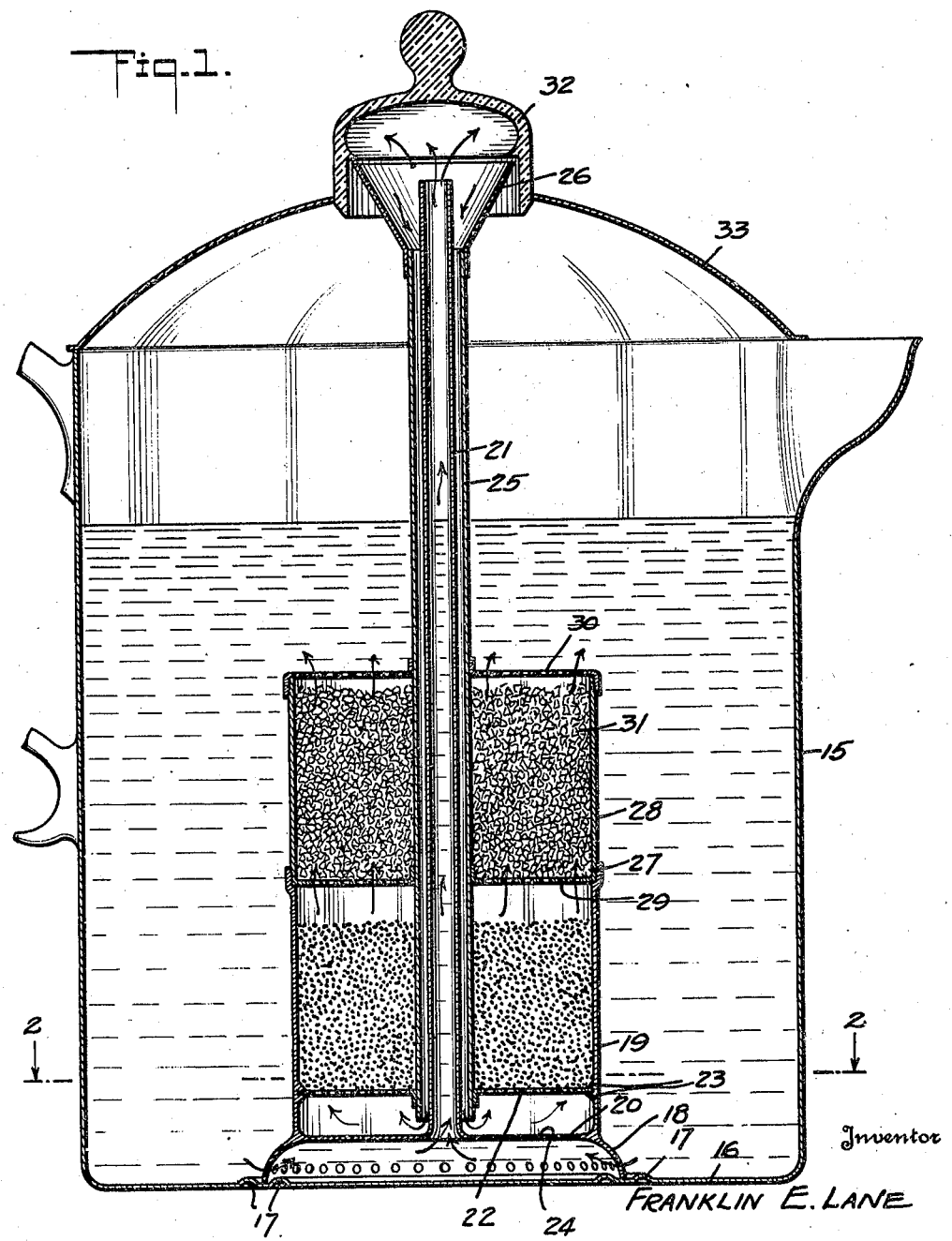

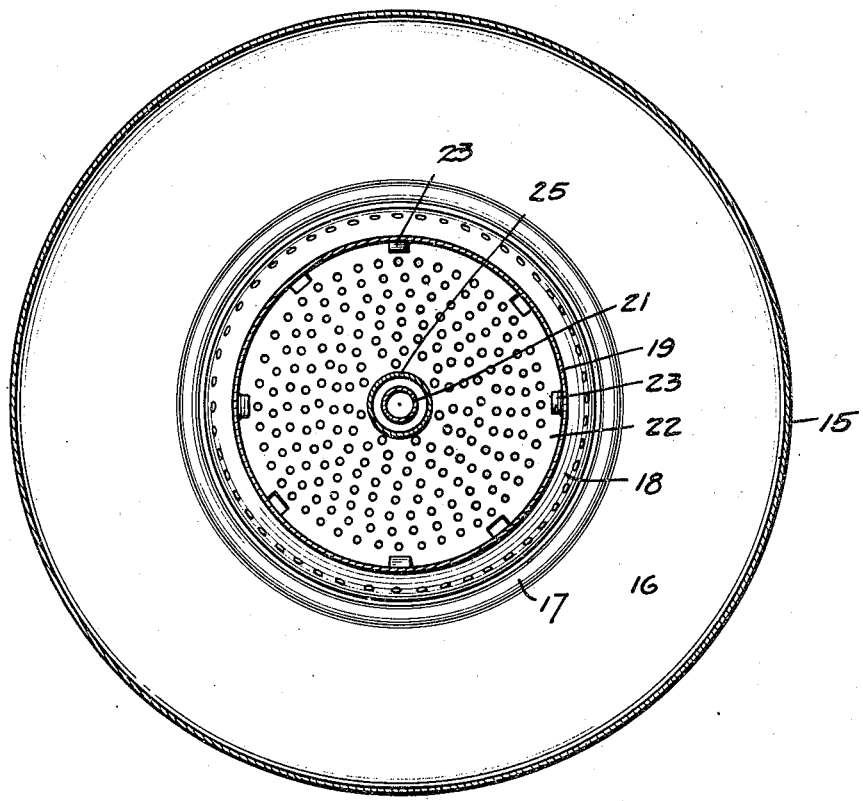

1,624,606

UNITED STATES PATENT OFFICE.

FRANKLIN EDWARD LANE, OF NACOZARI, MEXICO.

COFFEEPOT.

Application filed May 19, 1926. Serial No. 110,202.

My invention relates to coffee pots of the percolating type, and a purpose of my invention is the provision of a coffee pot which operates to percolate the coffee and to simultaneously filter the coffee so as to remove therefrom the minute grains of coffee, leaving a greatly clarified liquid of equal, if not superior flavor and aroma, in respect to coffee as heretofore made with percolators.

It is also a purpose of my invention to provide a coffee pot which prevents the finer grains of coffee from coming into contact with the highly heated bottom of the pot and being burned, which renders the final coffee bitter to the taste and thus destroying the real flavor of the coffee.

I will describe only one form of coffee pot embodying my invention, and will then point out the novel features thereof in claims.

In the drawings—

Figure 1 is a view showing in vertical section one form of coffee pot embodying my invention;

Figure 2 is a horizontal sectional view taken on the line 2—2 of Figure 1.

Referring specifically to the drawings, my invention in its present embodiment comprises a receptacle 15 formed of suitable material, having a bottom 16 formed on its inner side with two annular ribs 17 concentric to the center of the bottom and providing a groove in which is received the depending perforated base flange 18 of a coffee container 19. The container 19 includes a bottom wall 20 having a central opening merging into a tube 21 to be hereinafter referred to as a fountain tube. The coffee container also includes a false bottom 22 secured within the container by circumferentially spaced projections 23. The false bottom 23 is perforated as shown, and is supported in spaced relation to the bottom 20 so as to provide therebetween a chamber indicated at 24. The center of the false bottom is formed with an opening in which is secured, by means of a pressed fit, the lower end of a water tube 25 disposed in surrounding and spaced relation to the fountain tube 21 and provided at its upper end with a funnel 26.

The upper end of the coffee container 19 is threaded as indicated at 27 for connection with a cup shaped container 28 constituting part of a filtering device. This container 28 is provided with a perforated bottom 29 and a perforated and removable top 30, and the bottom and top members are both formed with central openings in which the water tube 25 is slidably received. Within the container 28 a suitable filtering material, indicated at 31, is contained, and though I desire to use any character of effective filtering material, I have found by experimentation that quartz is the most effective.

The lower end of the fountain tube 25 is in communication with the chamber 24, while its upper end, which terminates in the funnel 26, is in communication with the upper end of the fountain tube 21. The funnel 26 is received in a cap or plug 32 mounted in a central opening of the cover 33 of the receptacle 15 and formed of transparent material, such as glass, in order that the percolating action of the coffee can be at all times observed.

In the operation of the coffee pot, the container 19 is filled with ground coffee. This may be readily effected by unscrewing the container so as to expose the upper end of the container 19. A suitable quantity of water is now supplied to the receptacle 15 following the replacing of the coffee receptacle and filtering device. It will be understood that the annular ribs 17 in connection with the base flange 18 serve to center the coffee container and filtering device within the receptacle so that the upper ends of the tubes 21 and 25 will be disposed within the cap 32.

When the water in the receptacle is heated to the boiling point, it will be caused to circulate upwardly through the fountain tube 21 and discharged into the funnel 26 and then downwardly through the tube 25 into the chamber 24. From the chamber 24 it passes upwardly through the false bottom 22, through the coffee in the container 19 and upwardly through the filtering device, whence it is finally discharged back into the receptacle. The circulation of the water has been clearly indicated by the arrows in Figure 1, and during its passage through the coffee in the container 19 it will be clear that it absorbs the flavor of the coffee and carries with it the smaller grains thereof. Before it is again returned to the receptacle it is forced to traverse the filtering material and in so doing the fine grains are removed from the liquid, and the coffee thus clarified. In this manner a clarified coffee of superior aroma and flavor is made, the degree of clarity depending upon the character and quantity of filtering material employed. I have found in practice that quartz is a superior filtering material and will produce a coffee of light amber color without the strength of the coffee being lessened. By confining the coffee grains in the container 19 and circulating the water between the container and the bottom of the receptacle 15, the possibility of the fine coffee grains becoming burned due to contact with the bottom of the receptacle at the point where the heat is the greatest is eliminated, and in the final coffee produced it is devoid of that burned taste usually accompanying the coffee as produced by percolators heretofore proposed.

Although I have herein shown and described only one form of coffee pot embodying my invention, it is to be understood that various changes and modifications may be made therein without departing from the spirit of the invention and the scope and spirit of the appended claims.

I claim:

1. A coffee pot comprising a receptacle adapted to contain water, a coffee container in the receptacle, a filtering device in the receptacle, and means operating when the water in the receptacle boils to cause the boiling water to circulate through the coffee container and then through the filtering device, and finally discharging back into the receptacle.

2. A coffee pot as embodied in claim 1 wherein the filtering device contains quartz particles as the filtering material.

3. A coffee pot as embodied in claim 1 wherein the coffee container is in spaced relation to the bottom of the receptacle to allow circulation of water between the bottom of the receptacle and the container.

4. A coffee pot comprising a receptacle, a fountain tube supported in spaced relation to the bottom of the receptacle, a water tube surrounding the first tube, a coffee container in surrounding relation to the water tube and having a perforated false bottom arranged to provide a chamber which communicates with the lower end of the water tube, a funnel at the upper end of the water tube to cause liquid emitted from the upper end of the first tube to be discharged into the upper end of the water tube, and a perforated filtering device in superimposed relation with respect to the coffee container.

5. A coffee pot comprising a receptacle, a fountain tube supported in spaced relation to the bottom of the receptacle, a water tube surrounding the first tube, a coffee container in surrounding relation to the water tube and having a perforated false bottom arranged to provide a chamber which communicates with the lower end of the water tube, a funnel at the upper end of the water tube to cause liquid emitted from the upper end of the first tube to be discharged into the upper end of the water tube, a second container in surrounding relation to the water tube and detachably connected to the coffee container, said second container having the bottom and top thereof perforated and containing a filtering material.

6. A coffee pot as embodied in claim 5 wherein the bottom of the coffee container is provided with a depending perforated flange, and centering means is formed on the bottom of the receptacle to receive said flange.

FRANKLIN EDWARD LANE.